UNITED STATES PATENT OFFICE.

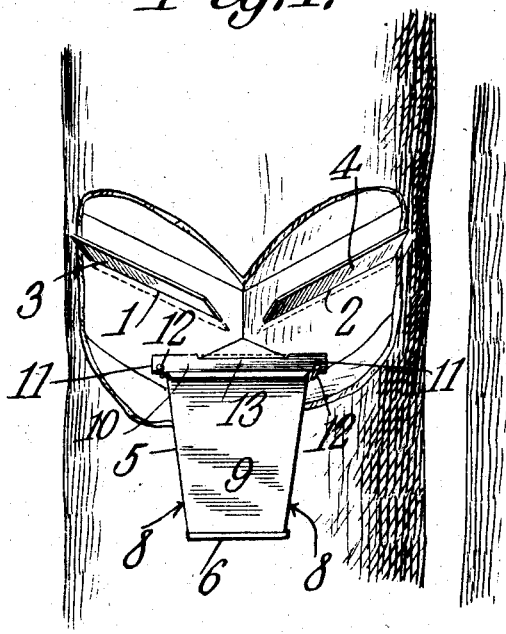

JOHN JACKSON PALMER, OF MADISON, FLORIDA.

TURPENTINE-CUP AND ATTACHMENT.

No. 864,385.  Specification of Letters Patent.  Patented Aug. 27, 1907.

Application filed March 23, 1907. Serial No. 364,148.

*To all whom it may concern:*

Be it known that I, JOHN JACKSON PALMER, a citizen of the United States, residing at Madison, in the county of Madison and State of Florida, have invented a new and useful Turpentine-Cup and Attachment, of which the following is a specification.

This invention relates to certain devices used in collecting turpentine; and are intended for use in collecting turpentine by the well known Herty method, which consists in chipping the bark from a suitable part of a tree and in the exposed surface cutting two gashes, with an ax, extending in a downward direction or towards each other in which are placed gutters for conveying the gum which collects on them towards a vessel hung from the tree. As these cups fill they are removed from the tree, emptied and returned again.

The object of the present invention is to improve the form of receptacle or cup by making it rectangular instead of circular in cross section; by making the back of the cup which rests against the tree perpendicular to the bottom; and by having the sides and front, converge slightly from the open top to the bottom. Forming a part of the back of the cup is a flange, by means of which, the cup is suspended from the tree.

Referring to the accompanying drawings: Figure 1 is a view of the improved device applied to a tree as seen from the front. Fig. 2 is a vertical sectional view of the cup attached to a tree a portion of the tree being shown in elevation. Fig. 3 is a top plan view of the improved cup detached. Fig. 4 is a perspective view of one of the gutter plates.

Similar numerals of reference indicate corresponding parts throughout the several figures of the drawings.

After a pine tree has been suitably chipped, somewhat after the manner indicated in Fig. 1, straight cuts or gashes 1 and 2 are made in the chipped surface extending downwardly toward each other and at such an angle to the surface of the tree that when the plates or gutters 3—4 are placed longitudinally therein they will incline downwardly towards the tree in a transverse direction, by which means they are made self supporting and not liable to drop out of the cuts as has previously been the case when the cuts or gashes 1 and 2 were made in an upward direction. The gutters 3 and 4 are made of flat sheet metal of suitable length and width to serve the purpose for which they are intended.

Below the downwardly converging ends of the plates 3—4 is suspended a cup 5 for receiving gum collected in the gutters 3—4. The cup 5 is rectangular in cross section and has a height about the same as other forms of cups used in this business. The bottom 6 of the cup is flat and its back 7 is made perpendicular to the bottom, and when in place rests against the tree in vertical position as may be clearly seen in Fig. 2. The side walls 8 converge slightly at equal angles from the top of the cup and the front 9 also converges towards the bottom but at a greater vertical angle than the sides 8. Attached to or formed integrally with the rear side 7 of the cup is a flange 10 bent rearwardly at an angle to the back and extending a short distance beyond the sides of the cup as at 11—11.

To attach the cup to a tree a horizontal gash 13 is made a short distance below the gutters 3—4 in an upward direction. Into this gash the flange 10 of the cup 5 is placed and nails 12 are driven into the tree below the projections 11, by this simple means the cup, although securely held in place, may be removed for emptying when it becomes filled.

Having thus described the invention what is claimed is:—

A cup for collecting turpentine made rectangular in cross section with a flat bottom, diverging side and front walls extending up from said bottom and a flat rear wall perpendicular thereto having a straight rearwardly inclined flange on its upper edge, the ends of which project beyond the sides of the cup and form brackets to rest on supports driven into a tree.

In testimony that I claim the foregoing as my own, I have hereto affixed my signature in the presence of two witnesses.

JOHN JACKSON PALMER.

Witnesses:
J. E. HASSELL,
J. H. HAVEN.